United States Patent
Mansouri Rad et al.

(10) Patent No.: US 10,230,468 B2
(45) Date of Patent: Mar. 12, 2019

(54) TRANSMISSION ADJUSTMENT FOR SPACE DIVISION MULTIPLEXING OF OPTICAL SIGNALS

(71) Applicant: Huawei Technologies Co., Ltd., Shenzhen (CN)

(72) Inventors: Mohammad Mehdi Mansouri Rad, Kanata (CA); Irfan Muhammad Fazal, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/171,413

(22) Filed: Jun. 2, 2016

(65) Prior Publication Data

US 2017/0353242 A1   Dec. 7, 2017

(51) Int. Cl.
| | |
|---|---|
| *H04J 14/02* | (2006.01) |
| *G02B 6/02* | (2006.01) |
| *H04J 14/04* | (2006.01) |
| *H04J 14/06* | (2006.01) |
| *H04B 10/25* | (2013.01) |
| *H04B 3/32* | (2006.01) |
| *H04B 10/079* | (2013.01) |
| *H04B 10/61* | (2013.01) |
| *H04L 1/00* | (2006.01) |

(52) U.S. Cl.
CPC ......... *H04B 10/2504* (2013.01); *H04B 3/32* (2013.01); *H04B 10/0795* (2013.01); *H04B 10/07953* (2013.01); *H04B 10/61* (2013.01); *H04J 14/02* (2013.01); *H04J 14/0256* (2013.01); *H04J 14/04* (2013.01); *H04L 1/0001* (2013.01); *H04L 1/004* (2013.01)

(58) Field of Classification Search
None
See application file for complete search history.

(56) References Cited

U.S. PATENT DOCUMENTS

| | | | | |
|---|---|---|---|---|
| 7,327,914 B1 * | 2/2008 | Kahn | ................... | G02B 6/4206 385/15 |
| 8,693,888 B2 * | 4/2014 | Pfau | ..................... | H04B 10/616 398/140 |
| 8,767,288 B2 * | 7/2014 | Bai | ..................... | H04B 10/2931 359/341.33 |

(Continued)

FOREIGN PATENT DOCUMENTS

| | | |
|---|---|---|
| CN | 102075479 A | 5/2011 |
| CN | 103684552 A | 3/2014 |
| CN | 103907302 A | 7/2014 |

OTHER PUBLICATIONS

Tangdiongga, Eduward, et al., "Experimental Evaluation of Optical Crosstalk Mitigation Using Phase Scrambling," IEEE Photonics Technology Letters, vol. 12, No. 5, pp. 567-569, 2000.

(Continued)

*Primary Examiner* — Oommen Jacob

(57) ABSTRACT

Spatial division multiplexing (SDM) allows multiple optical signals to be multiplexed onto a single optical link. Performance of SDM systems may be improved by monitoring performance metrics indicative of crosstalk between the spatially multiplexed signals and adjusting at least one transmission characteristic of one or more of the multiplexed signals in order to reduce the impact of the intermodal crosstalk.

24 Claims, 9 Drawing Sheets

(56) References Cited

U.S. PATENT DOCUMENTS

| | | | |
|---|---|---|---|
| 2005/0135730 A1* | 6/2005 | Welch | B82Y 20/00 385/14 |
| 2009/0028552 A1* | 1/2009 | Zhang | H04B 10/572 398/25 |
| 2010/0329671 A1* | 12/2010 | Essiambre | G02B 6/14 398/44 |
| 2012/0177365 A1* | 7/2012 | Winzer | H04B 10/2581 398/26 |
| 2012/0224807 A1* | 9/2012 | Winzer | G02B 6/14 385/28 |
| 2012/0250008 A1* | 10/2012 | Hayashi | G01M 11/335 356/73.1 |
| 2013/0148965 A1* | 6/2013 | Losio | H04J 14/06 398/65 |
| 2013/0236175 A1 | 9/2013 | Sethumadhavan et al. | |
| 2013/0302002 A1* | 11/2013 | Imamura | G02B 6/02042 385/127 |
| 2014/0101512 A1* | 4/2014 | Djordjevic | H03M 13/1148 714/758 |
| 2014/0140694 A1* | 5/2014 | Zhou | H04J 14/02 398/44 |
| 2014/0219653 A1* | 8/2014 | Djordjevic | H04J 14/06 398/44 |
| 2014/0270759 A1* | 9/2014 | Djordjevic | H04L 1/0043 398/44 |
| 2014/0314415 A1* | 10/2014 | Vassilieva | H04J 14/0227 398/76 |
| 2014/0341236 A1* | 11/2014 | Yu | H04J 14/06 370/499 |
| 2015/0030325 A1* | 1/2015 | Chang | H04J 14/04 398/44 |
| 2015/0043910 A1* | 2/2015 | Koebele | H04J 14/04 398/44 |
| 2015/0086200 A1* | 3/2015 | Xie | H04B 10/2581 398/44 |
| 2015/0372782 A1* | 12/2015 | Segev | H04B 10/2581 398/44 |
| 2016/0094308 A1* | 3/2016 | Liboiron-Ladouceur | H04J 14/04 398/44 |
| 2016/0187577 A1* | 6/2016 | Sasaki | G02B 6/287 385/126 |
| 2016/0202142 A1* | 7/2016 | Wang | G01M 11/3109 356/73.1 |
| 2016/0233959 A1* | 8/2016 | Murshid | H04B 10/2581 |
| 2016/0366632 A1* | 12/2016 | Cui | H04W 40/04 |

OTHER PUBLICATIONS

Tangdiongga, Eduward, "Crosstalk Mitigation Techniques in Multi-Wavelength Networks Comprising Photonic Integrated Circuits," Eindhoven University of Technology, 2001.

Zhang, Bo, et al., "Slow light on Gbit/s differential-phase-shift keying signals" Optics Express, vol. 15, No. 4, pp. 1878-1883, 2007.

International Search Report for corresponding International Application No. PCT/CN2017/083778 dated Jul. 28, 2017.

* cited by examiner

TRANSMISSION ADJUSTMENT FOR SPACE DIVISION MULTIPLEXING OF OPTICAL SIGNALS

TECHNICAL FIELD

The current disclosure relates to optical networks and in particular to optical networks employing spatial division multiplexing.

BACKGROUND

The capacity demands for communication networks is ever increasing. Various techniques have been devised for meeting these capacity demands. Optical networks can support large capacities. A single optical link, such as a fiber optic cable, may carry multiple data channels by using various diversity techniques, including for example wavelength division multiplexing (WDM) and/or polarization division multiplexing (PDM). The data carrying ability of each of the individual data channels may be increased using various data encoding or modulation techniques such as amplitude modulation, frequency modulation, and quadrature modulation.

Encoding, modulation and WDM/PDM techniques can provide increased capacity for optical links. However, additional techniques are required to meet the increasing capacity demands. One technique for increasing capacity of an optical link is space division multiplexing (SDM). SDM can be used to multiplex multiple optical signals, which in turn may be WDM and/or PDM signals, onto a signal optical link.

While SDM optical links allow the spatial multiplexing of multiple optical signals onto the single SDM optical link, the performance of the SDM optical links may limit their use.

SUMMARY

In accordance with the present disclosure there is provided a method for use in a spatial division multiplexed (SDM) optical network transmitting a plurality of optical signals over an optical link, wherein each one of the plurality of optical signals is transmitted in a respective one of a plurality of spatial modes of the optical link, the method comprising: monitoring a transmission performance metric of the optical link, the transmission performance metric indicative of crosstalk between two of the plurality of optical signals transmitted in different ones of the plurality of spatial modes; and adjusting a transmission characteristic of one of the two optical signals to reduce the crosstalk indicated by the monitored transmission performance metric.

In a further embodiment of the method, the transmission characteristic comprises a spectral profile of the one of the two optical signals.

In a further embodiment of the method, each one of the two optical signals comprises a wavelength division multiplexed (WDM) optical signal having a plurality of optical channels having different optical channel frequencies.

In a further embodiment of the method, adjusting the transmission characteristic of the one of the two optical signals comprises shifting an optical channel frequency of an optical channel of the plurality of optical channels of a corresponding WDM optical signal by a frequency shift.

In a further embodiment of the method, adjusting the transmission characteristic of the one of the two optical signals comprises shifting each optical channel frequency of the plurality of optical channels of the corresponding WDM optical signal by the frequency shift.

In a further embodiment of the method, shifting the optical channel frequency results in shifting of at least a portion of in-band optical channel crosstalk between the two WDM optical signals to out-of-band optical channel crosstalk.

In a further embodiment of the method, the individual optical channels of the WDM optical signal are received at a coherent receiver capable of automatically tracking the frequency shift.

In a further embodiment of the method, an indication of the frequency shift is provided to receivers of the individual optical channels of the corresponding WDM optical signal.

In a further embodiment, the method further comprises adjusting a transmission characteristic of the other one of the two optical signals.

In a further embodiment of the method, adjusting the transmission characteristic comprises adjusting at least one of: a data rate of the one of the two optical signals; a modulation scheme of the one of the two optical signals; a forward-error-correction (FEC) coding used by the one of the two optical signals; a modulation depth of the one of the two optical signals; a constellation map of the one of the two optical signals; a power level of at the of the two optical signals; a spectrum shape of at the of the two optical signals; a frequency spectral utilization of the one of the two optical signals; and a coding efficiency of the one of the two optical signals.

In a further embodiment of the method, the transmission performance metric comprises at least one of: a Q-factor of at least one of the two optical signals; a Q-factor of an optical supervisory channel (OSC) signal; a bit-error-rate of at least one of the two optical signals; a bit-error-rate of the OSC signal; a signal-to noise ratio of at least one of the two optical signals; and a signal-to noise ratio of the OSC signal.

In a further embodiment of the method, the optical link is provided by one of: a multi-mode fiber; a few-mode fiber; a multi-core fiber; a hybrid multi-core multi-mode fiber; a ring core fiber; a hollow-core fiber; an orbital angular momentum (OAM) fiber; and a free-space optical link.

In accordance with the present disclosure there is provided a controller in a spatial division multiplexed (SDM) optical network transmitting a plurality of optical signals over an optical link, wherein each one of the plurality of optical signals is transmitted in a respective one of a plurality of spatial modes of the optical link, the controller comprising: at least one processing unit for executing instructions; and at least one memory unit for storing instructions, which when executed by the at least one processing unit configure the controller to: monitor a transmission performance metric of the optical link, the transmission performance metric indicative of crosstalk between two of the plurality of optical signals transmitted in different ones of the plurality of spatial modes; and adjust a transmission characteristic of one of the two optical signals to reduce the crosstalk indicated by the monitored transmission performance metric.

In a further embodiment of the controller, the controller is provided by: a centralized controller; a distributed controller; or a hybrid centralized-distributed controller.

In a further embodiment of the controller, the SDM optical network is a software-defined network (SDN).

In a further embodiment of the controller, the transmission characteristic comprises a spectral profile of the one of the two optical signals.

In a further embodiment of the controller, each one of the two optical signals comprises a wavelength division multiplexed (WDM) optical signal having a plurality of optical channels having different optical channel frequencies.

In a further embodiment of the controller, adjusting the transmission characteristic of the one of the two optical signals comprises shifting an optical channel frequency of an optical channel of the plurality of optical channels of a corresponding WDM optical signal by a frequency shift.

In a further embodiment of the controller, adjusting the transmission characteristic of the one of the two optical signals comprises shifting each optical channel frequency of the plurality of optical channels of the corresponding WDM optical signal by the frequency shift.

In a further embodiment of the controller, shifting the optical channel frequency results in shifting of at least a portion of in-band optical channel crosstalk between the two WDM optical signals to out-of-band optical channel crosstalk.

In a further embodiment of the controller, the individual optical channels of the WDM optical signal are received at a coherent receiver capable of automatically tracking the frequency shift.

In a further embodiment of the controller, an indication of the frequency shift is provided to receivers of the individual optical channels of the corresponding WDM optical signal.

In a further embodiment of the controller, the controller is further configured to adjust a transmission characteristic of the other one of the two optical signals.

In a further embodiment of the controller, adjusting at least one transmission characteristic comprises adjusting at least one of: a data rate of the one of the two optical signals; a modulation scheme of the one of the two optical signals; a forward-error-correction (FEC) coding used by the one of the two optical signals; a modulation depth of the one of the two optical signals; a constellation map of the one of the two optical signals; a power level of at the of the two optical signals; a spectrum shape of at the of the two optical signals; a frequency spectral utilization of the one of the two optical signals; and a coding efficiency of the one of the two optical signals.

In a further embodiment of the controller, the transmission performance metric comprises at least one of: a Q-factor of at least one of the two optical signals; a Q-factor of an optical supervisory channel (OSC) signal; a bit-error-rate of at least one of the two optical signals; a bit-error-rate of the OSC signal; a signal-to noise ratio of at least one of the two optical signals; and a signal-to noise ratio of the OSC signal.

In a further embodiment of the controller, the optical link is provided by one of: a multi-mode fiber; a few-mode fiber; a multi-core fiber; a hybrid multi-core multi-mode fiber; a ring core fiber; a hollow-core fiber; an orbital angular momentum (OAM) fiber; and a free-space optical link.

BRIEF DESCRIPTION OF THE DRAWINGS

Embodiments are described herein with reference to the appended drawings, in which.

DETAILED DESCRIPTION

Optical networks transmit optical signals from a source to a destination over an optical link, which may be provided by an optical fiber. Optical fibers may be designed and fabricated to support a single mode. Such fibers are referred to as single mode fibers. Since single mode fibers do not support multiple modes, they do not support spatial division multiplexing (SDM). Optical fibers may be designed and fabricated that allow multiple spatial modes to be transmitted over the single fiber. Such fibers may be used to spatially multiplex a plurality of optical signals on a single fiber, and may be referred to as SDM fibers. SDM fibers may include, for example, multi-core fibers, few-mode or multi-mode fibers, hybrid multi-core multi-mode fibers, ring core fibers, hollow-core fibers or orbital angular momentum (OAM) fibers. Additionally or alternatively, an SDM optical link may be provided by a free-space optical link. Although SDM optical links provide different spatial modes over which separate optical signals may be simultaneously transmitted, optical power may leak between the different spatial modes of the SDM link. The optical power leakage between the different spatial modes can result in crosstalk between the optical signals of the different spatial modes. This intermodal crosstalk reduces the transmission efficiency of the SDM links. Improved design and fabrication processes for the SDM links may reduce intermodal crosstalk; however, as described further below, the intermodal crosstalk may be reduced by adjusting one or more transmission characteristics of at least one of the optical signals.

Figure 1:
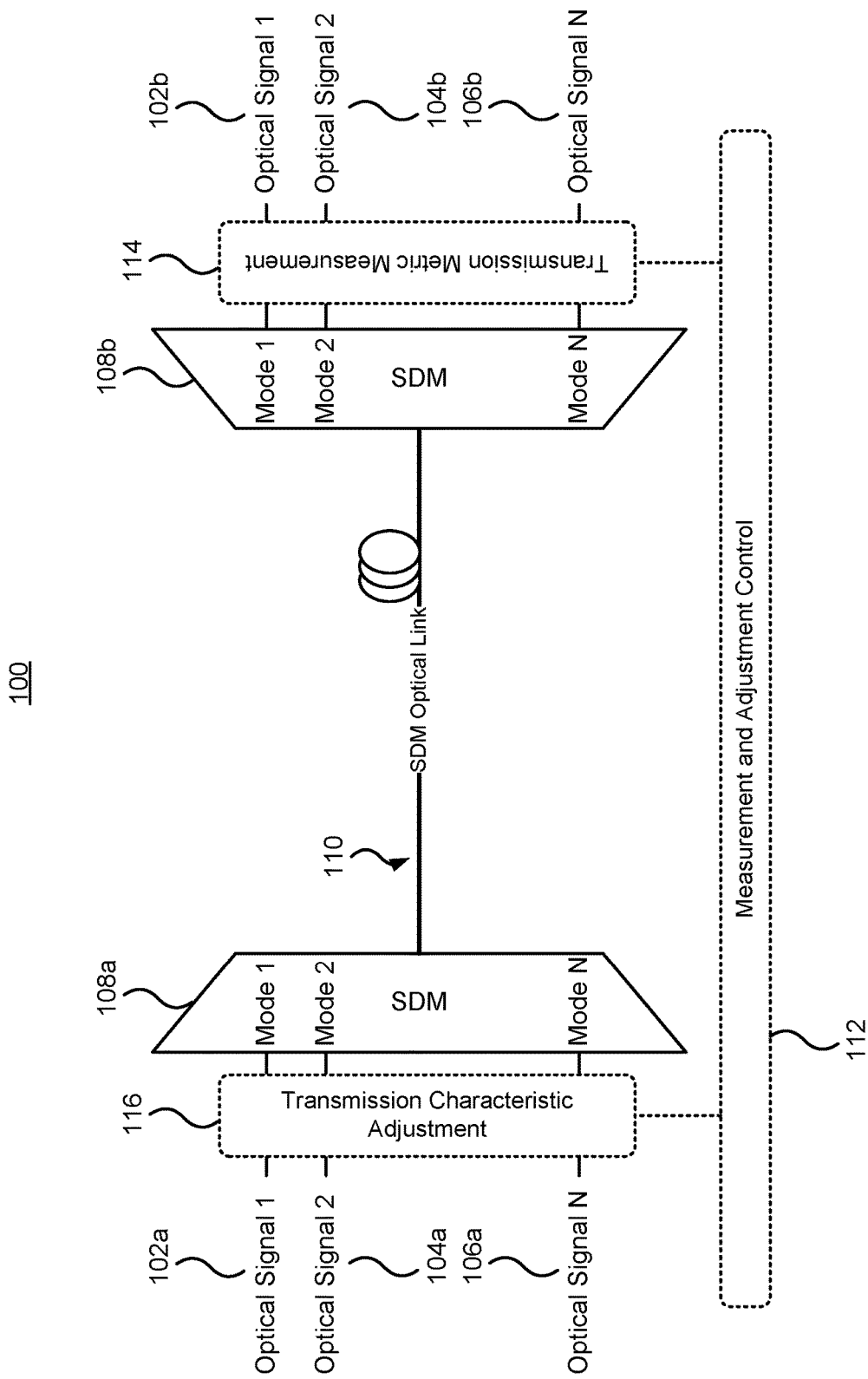
FIG. 1 depicts spatial division multiplexing (SDM) of optical signals incorporating crosstalk-based transmission adjustment.

FIG. 1 depicts spatial division multiplexing (SDM) of optical signals with crosstalk-based transmission adjustment. FIG. 1 schematically depicts the SDM transmission of optical signals in an optical network. FIG. 1 depicts a simplified view of an optical network 100, and numerous components of a practical optical network have been omitted from the representation for clarity of the FIG. and description. A number of input optical signals 102a, 104a, 106a are multiplexed together into a single optical link by an SDM multiplexer 108a. The SDM multiplexer multiplexes each one of the optical signals 102a, 104a, 106a onto a respective spatial mode of the SDM link. All of the optical signals 102a, 104a, 106a are multiplexed together into an SDM optical signal 110. The SDM optical signal 110 is carried over the SDM link to an SDM demultiplexer 108b. The SDM demultiplexer 108b receives the SDM optical signal 110 and demultiplexes the optical signals carried by the plurality of spatial modes of the SDM link. The SDM demultiplexer 108b outputs the demultiplexed optical signals 102b, 104b, 106b. The output optical signals 102b, 104b, 106b correspond to the input optical signals 102a, 104a, 106a; however, as a result of possible transmission noise from optical amplifiers and losses as well as crosstalk between the different spatial modes within the SDM link, the output optical signals 102b, 104b, 106b will not be identical to the input optical signals 102a, 104a, 106a.

The intermodal crosstalk between the different spatial modes can reduce the optical signal to noise ratio (OSNR) of the signals. The OSNR of the received optical signals 102b, 104b, 106b must be above a required OSNR (ROSNR) of an optical receiver in order to be successfully received. A performance characteristic of the optical network 100, such as the transmission distance or transmission power of the SDM optical signal 110, may be limited or reduced by the effects of intermodal crosstalk. In order to improve the performance of the transmission of the SDM optical signal 110, measurement and adjustment control functionality 112 is provided. The measurement and adjustment control functionality 112 cooperates with transmission metric measurement functionality 114 that measures one or more transmission metrics that provide an indication of the intermodal crosstalk. The transmission metrics measured by the transmission metric measurement functionality 114 is used by the measurement and adjustment control functionality 112 determines one or more transmission characteristics of the SDM-multiplexed optical signals. The measurement and adjustment control functionality 112 cooperates with transmission characteristic adjustment functionality 116 for adjusting the transmission characteristic as determined by the measurement and adjustment control functionality 112 in order to reduce intermodal crosstalk. The measurement and adjustment control functionality 112, transmission metric measurement functionality 114, and transmission characteristic adjustment functionality 116 may be implemented at least in part in different network components within the optical network 100. For example, the measurement and adjustment control functionality 112 may be implemented as a centralized controller or as a distributed controller within various distributed network components. Hybrid centralized-distributed controllers combining portions of a centralized controller with portions of a distributed controller may also be used. Further, the transmission metric measurement functionality 114 may be implemented at least partially within optical receivers, demultiplexer, or decoders that can provide one or more measurements of the received signals and the transmission characteristic adjustment functionality 116 may be implemented, at least partially, within encoders, multiplexers or transmitters that can adjust one or more transmission characteristics. Although depicted as one-way communication in FIG. 1 for simplicity, it is possible for the SDM multiplexing with crosstalk-based transmission adjustment to be applied in bi-directional optical networks.

As described above, optical signals may be multiplexed together on different spatial modes of an optical link. The optical signals carried by each of the spatial modes may be provided by various encoding, modulation and multiplexing techniques. For example, optical signals may use different encoding or coding schemes such as Reed-Solomon (RS) encoding, Bose Chaudhuri Hocquenghem (BCH) encoding, low-density parity check (LDPC) encoding or other forward error correcting coding techniques. Further, the optical signals may use different modulation techniques such as, for example, amplitude modulation, on-off keying (OOK) modulation, binary phase shift keying (BPSK) modulation, quadrature phase shift keying (QPSK) modulation, differential phase shift keying (DPSK) modulation, frequency shift keying (FSK) modulation, quadrature amplitude modulation (QAM). The encoded and modulated signals may be further multiplexed using different multiplexing techniques such as wavelength division multiplexing (WDM), time division multiplexing (TDM) and polarization division multiplexing (PDM). Regardless of the particular types of encoding, modulation and multiplexing used for a particular optical signal, the different optical signal may be multiplexed together onto an SDM optical link using spatial division multiplexing.

As described above, a plurality of optical signals are multiplexed on a plurality of different spatial modes of an SDM optical link. Transmission metrics of optical signals may be measured and used as an indication of crosstalk between the different spatial modes and transmission characteristics of one or more transmitted optical signals can be adjusted in order to reduce the crosstalk between spatial modes and so improve performance of the SDM transmission.

Figure 2:
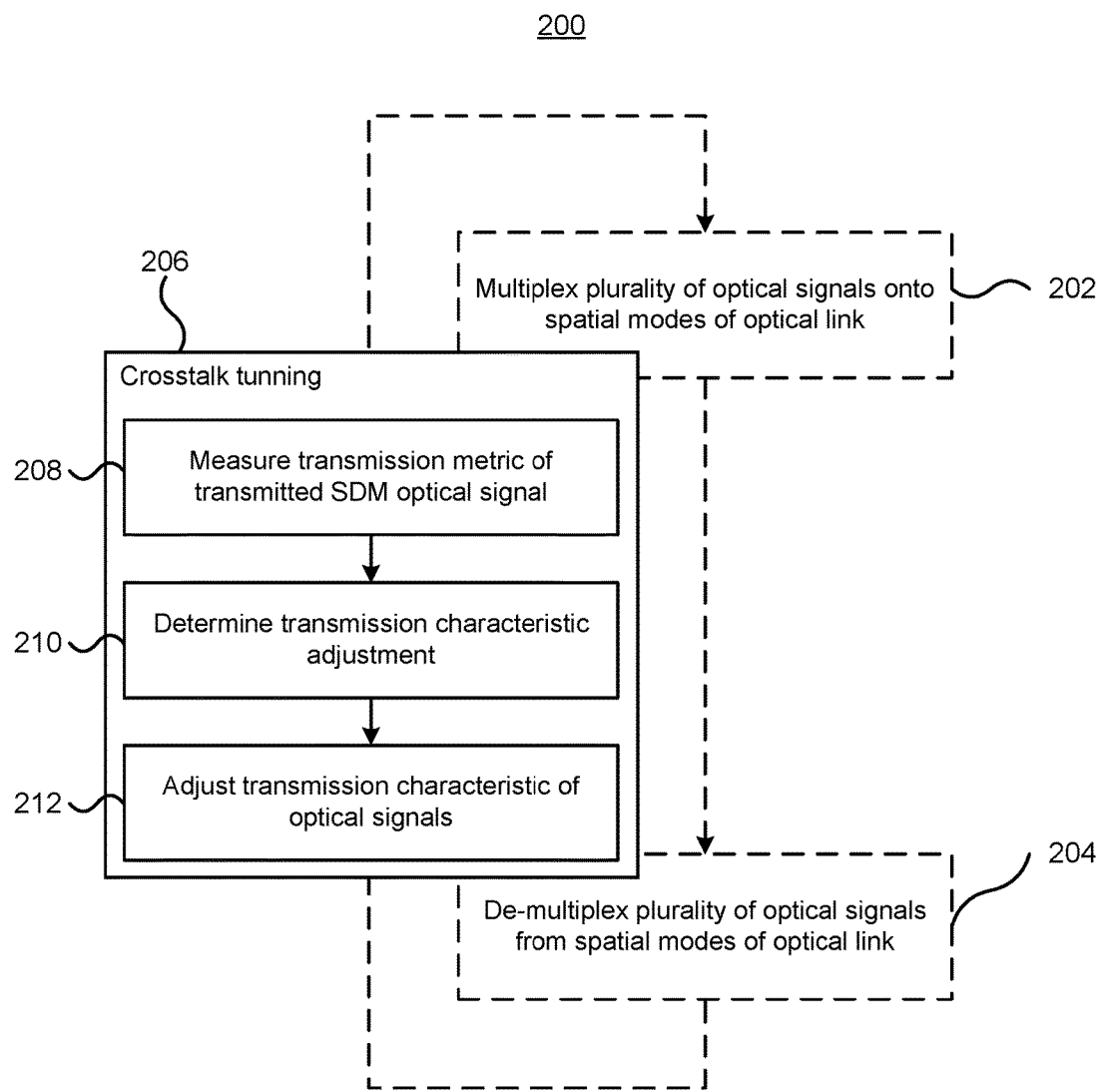
FIG. 2 depicts a method for SDM transmission and crosstalk-based transmission adjustment.

FIG. 2 depicts a method for SDM transmission and crosstalk-based transmission adjustment. The method 200 includes the transmission and reception of optical signals over an SDM optical link depicted in broken lines. The transmission and reception of the optical signals over the SDM optical link includes multiplexing a plurality of optical signals onto different spatial modes of the SDM optical link (202). The individual optical signals may use different encoding, modulation and/or multiplexing techniques. Regardless of the particulars of the individual optical signals, the SDM-multiplexed optical signal are transmitted over the SDM optical link and received at an SDM demultiplexer. The optical signals are demultiplexed from the different spatial modes of the optical link (204). As optical signals are multiplexed onto the SDM optical link, transmitted and demultiplexed performance metrics may be measured and used in tuning transmission characteristics of the optical signals in order to improve intermodal crosstalk performance, referred to as crosstalk tuning. The crosstalk tuning process 206 may be performed continuously in which case the performance metrics are continuously measured and used in continually adjusting transmission characteristics. Alternatively, the crosstalk tuning may be performed over discrete time intervals. For example, performance metrics may be measured for a period of time, or until the metric has varied by a threshold amount, and then used to adjust the transmission characteristics.

The crosstalk tuning process 206 comprises measuring one or more transmission metrics of the transmitted SDM optical signal (208). The transmission metrics may be measured from the received SDM optical signal, one or more of the optical signals multiplexed on the spatial modes of the SDM optical link, or one or more data signals carried possibly carried by one or more of the optical signals. The measured transmission metric may provide an indication of the intermodal crosstalk. The transmission metric may include one or more of, for example, a bit error rate (BER) of transmitted data signals, an optical signal to noise ratio (OSNR) of one or more of the optical signals, and a quality (Q) factor of one or more of the signals. The transmission metric may be measured from the optical signals associated with data being transmitted, or may be measured from optical signals of an optical supervisory channel (OSC). The measured transmission metrics are used to determine adjustments to one or more transmission characteristics (210) that may improve, or reduce, the intermodal crosstalk. The determined adjustments to the transmission characteristics are then used to adjust the particular transmission characteristics of the one or more optical signals (212). The transmission characteristics are adjusted and the optical signals, with the adjusted transmission characteristics are multiplexed onto the different spatial modes of the SDM optical link. Various transmission characteristics may be adjusted in order to reduce intermodal crosstalk, including, for example a data rate of at least one of the optical signals, a modulation scheme of at least one of the optical signals, a forward-error-correction (FEC) coding of at least one of the optical signals, a modulation depth of at least one of the optical signals, and a constellation map of at least one of the optical signals, a wavelength channel or frequency assignment within a WDM signal, a power level of at least one of the optical signals, a frequency spectral utilization of at least one of the optical signals, a coding efficiency of at least one of the optical signals, as well as other characteristics that may adjust the transmitted signals in order to reduce the intermodal crosstalk of the spatial modes of the SDM optical link.

As described above, the crosstalk tuning process 206 measures, or otherwise monitors, performance metrics of the transmitted signals. The measured performance metrics may provide an indication of intermodal crosstalk between the different spatial modes of the SDM optical link and are used to adjust transmission characteristics of the optical signals in order to reduce the crosstalk and improve the performance of the SDM transmission.

Figure 3:
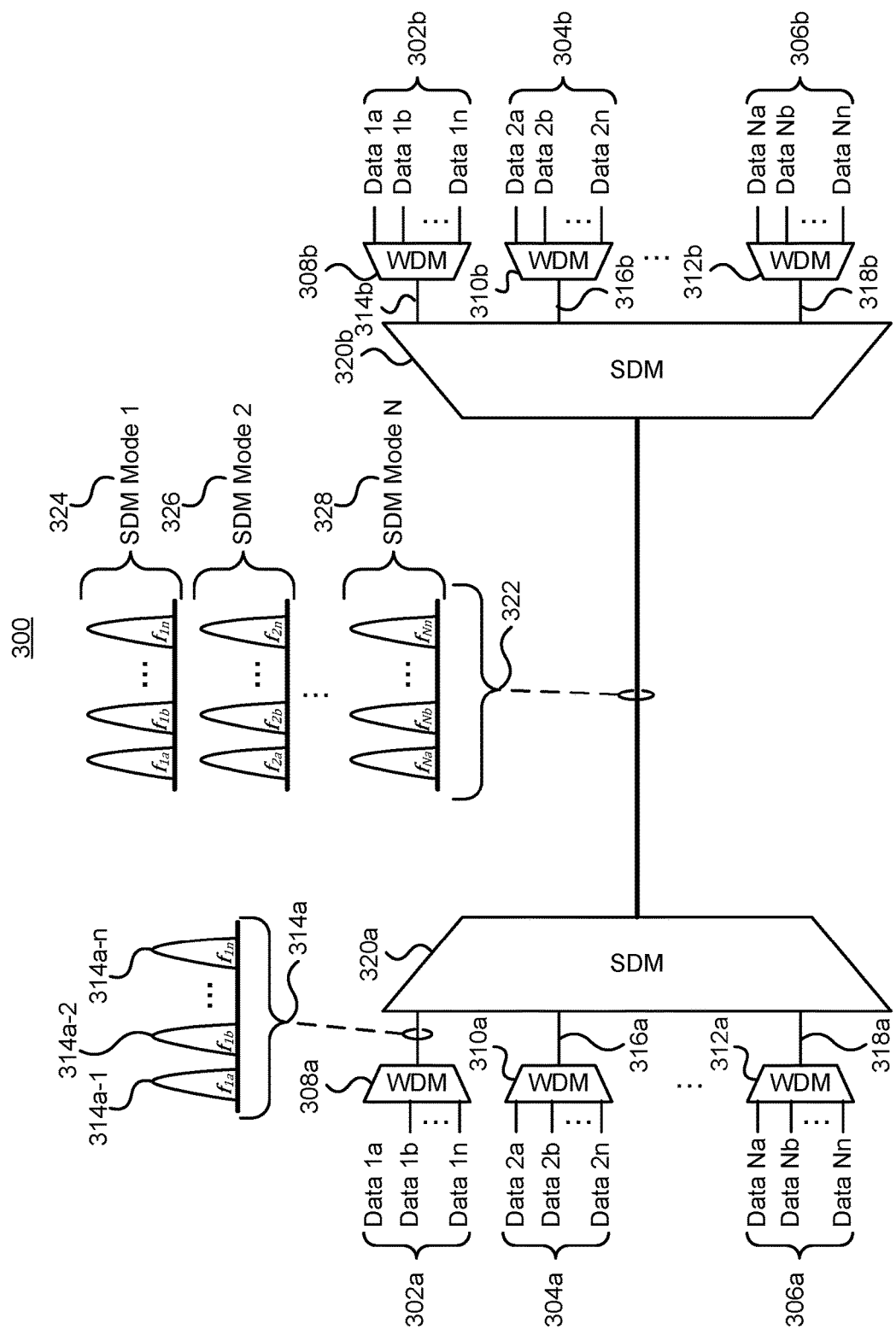
FIG. 3 depicts SDM of wavelength division multiplexing (WDM) optical signals.

FIG. 3 depicts schematically an optical network for transmission of SDM-multiplexed and wavelength division multiplexed (WDM) optical signals. The schematic optical network 300 depicted in FIG. 3 is similar to the network 100 described above with reference to FIG. 1; however, the optical network 300 multiplexes a plurality of data signals 302a, 304a, 306a into respective WDM signals 314a, 316a, 318a. It is noted that crosstalk tuning functionality, including measurement and adjustment control functionality, transmission metric measurement functionality and transmission characteristic adjustment functionality, is omitted from FIG. 3 for clarity of the figure. As described further with particular reference to FIGS. 4 and 5, the network 300 may monitor performance metrics and adjust transmission characteristics, and in particular optical frequencies of the WDM optical signals, of the optical signals in order to reduce crosstalk between spatial modes of the SDM optical link.

A plurality of data signals 302a, 304a, 306a are provided to respective WDM multiplexers 308a, 310a, 312a. Each of the multiplexers 308a, 310a, 312a are depicted as multiplexing 'n' data signals into a single WDM signal 314a, 316a, 318a; however, it will be appreciated that the individual WDM multiplexers 308a, 310a, 312a may multiplex different numbers of data signals together. Further, the individual WDM multiplexers 308a, 310a, 312a may be tunable WDM multiplexers that allow the adjustment of the frequency channel used for carrying each one of the data signals 302a, 304a, 306a. As depicted for WDM signal 314a, each of the WDM signals comprise a plurality of different wavelength channels 314a-1, 314a-2, 314a-n that each are used to transmit a respective one of the data signals 302a. For example, the WDM multiplexer 308a multiplexes a first one of the data signals 302a, Data 1a, onto a first wavelength channel 314a-1 at a frequency of $f_{1a}$, a second one of the data signals 304a, Data 1b, onto a second wavelength channel 314a-2 at a frequency of $f_{1b}$, etc. The particular frequencies of the wavelength channels of the WDM signals 314a, 316a, 318a may vary between the WDM signals.

The plurality of WDM signals 314a, 316a, 318a are multiplexed together by an SDM multiplexer 320a. Each one of the WDM signals is multiplexed onto a respective spatial mode of the SDM optical link. The SDM optical signal 322 comprises the WDM signals that have been multiplexed onto the spatial modes 324, 326, 328 of the SDM optical link. The number of spatial modes, and as such the number of WDM optical signals that can be multiplexed together, depends upon the particular type of the SDM optical link.

The multiplexed SDM optical signal is received at an SDM de-multiplexer 320b and de-multiplexes the WDM optical signals from the different spatial modes. The de-multiplexed WDM optical signals 314b, 316b, 318b are provided to respective WDM de-multiplexers 308b, 310b, 312b that de-multiplex the individual data signals 302b, 304b, 306b. As with the WDM multiplexers 308a, 310a, 312a, the WDM de-multiplexers 308b, 310b, 312b may be tunable to allow controlling the frequencies at which the different data signals are demultiplexed from.

Although the SDM optical link provides a plurality of different spatial modes, optical power may leak between the different modes, resulting in crosstalk between the different signals. The crosstalk may affect corresponding wavelength channels of the WDM signals. For example, the wavelength channels of the WDM signals at optical frequencies of $f_{1a}$, $f_{2a}$, and $f_{Na}$ may generate intermodal crosstalk between the SDM multiplexed WDM signals 324, 326, 328 as a result of the optical power leakage between the different spatial modes. As described further below with particular reference to FIGS. 4 and 5, the optical frequencies of the wavelength channels used by the individual SDM multiplexed WDM optical signals 324, 326, 328 may be shifted in order to reduce the intermodal crosstalk.

Figure 4:
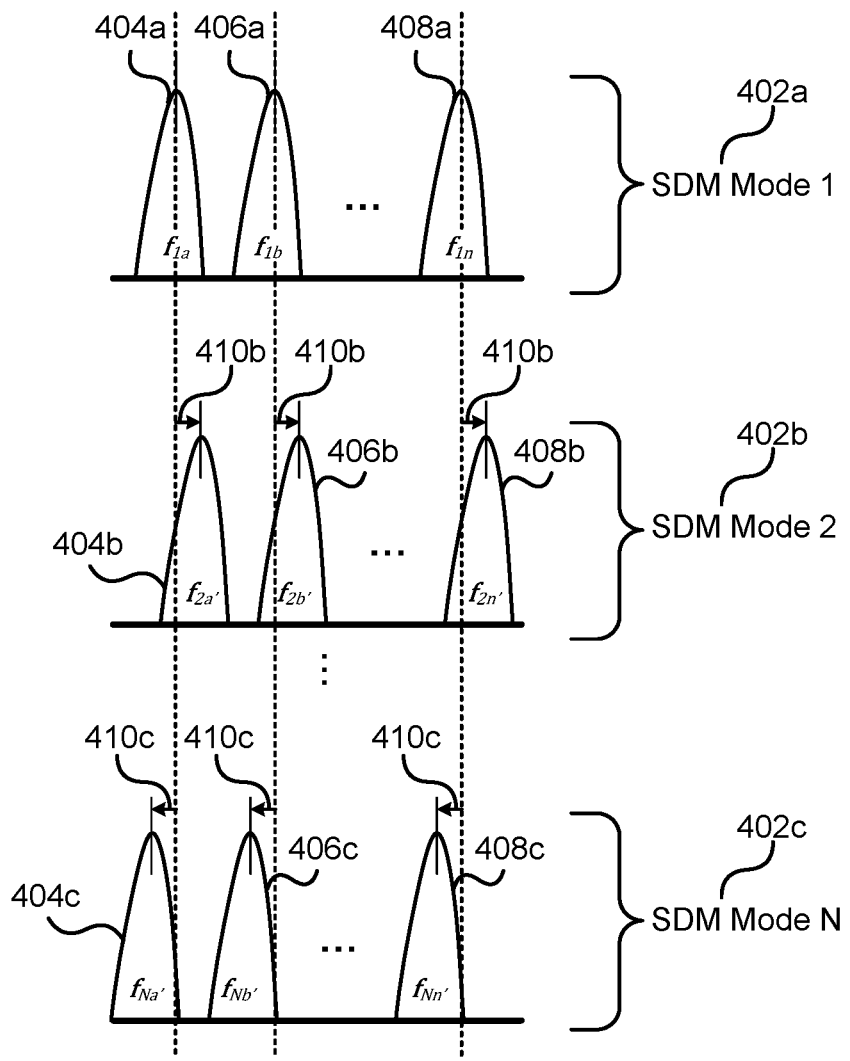
FIG. 4 depicts spectral adjustment of WDM optical signals for SDM transmissions.

FIG. 4 depicts spectral adjustment of WDM optical signals for SDM transmissions. A plurality of WDM signals are multiplexed together on different spatial modes 402a, 402b, 402c of an SDM optical link. In FIG. 4, each of the SDM-multiplexed WDM signals may comprise a plurality of individual wavelength channels at particular wavelengths spaced across a range of wavelengths. As an example, each of the WDM signals may comprise channels at wavelengths in the range of 1530 nm-1560 nm, which may be referred to as the C-band. It will be appreciated that the WDM signals may comprise different wavelengths from the C-band. Further, although the individual WDM signals 402a, 402b, 402c are depicted as each have wavelength channels at similar frequencies, it is possible for each of the WDM signals to have different wavelength channels following ITU 50 GHz/100 GHz channel frequency grid. The wavelength channel occupancy may not be fixed such as in flexgrid networks. The WDM signals are depicted as having a number of different wavelength channels. For example, WDM signal 402a is depicted as having a number of different wavelength channels 404a, 406a, 408a centered at optical frequencies of $f_{1a}$, $f_{2a}$, and $f_{Na}$. There may be crosstalk between the respective wavelength channels 404a, 406a, 408a, 404b, 406b, 408b, and 404c, 406c, 408c of the WDM signals 402a, 402b, 402c.

In order to reduce the intermodal crosstalk, one or more of the WDM signals may be adjusted in order to shift the optical frequencies of the wavelength channels of the WDM signals. FIG. 4 depicts the spectral adjustment of two SDM-multiplexed WDM signals, namely WDM signals 402b, 402c. The spectral adjustment provides an equal frequency shift to each wavelength channel in a WDM signal. As depicted, the wavelength channels 404b, 406b, 408b are shifted up by an equal frequency shift depicted by arrows 410b. Similarly, each of the wavelength channels 404c, 406c, 408c are shifter down by an equal frequency shift depicted by arrows 410c. By adjusting the spectrum of one or more of the WDM signals multiplexed onto the different spatial modes of the SDM link, the crosstalk between the WDM signals, and in particular the wavelength channels of the WDM signals, may be reduced. The spectrum adjustment described above may transform in-band crosstalk into out-of band crosstalk.

Figure 5:
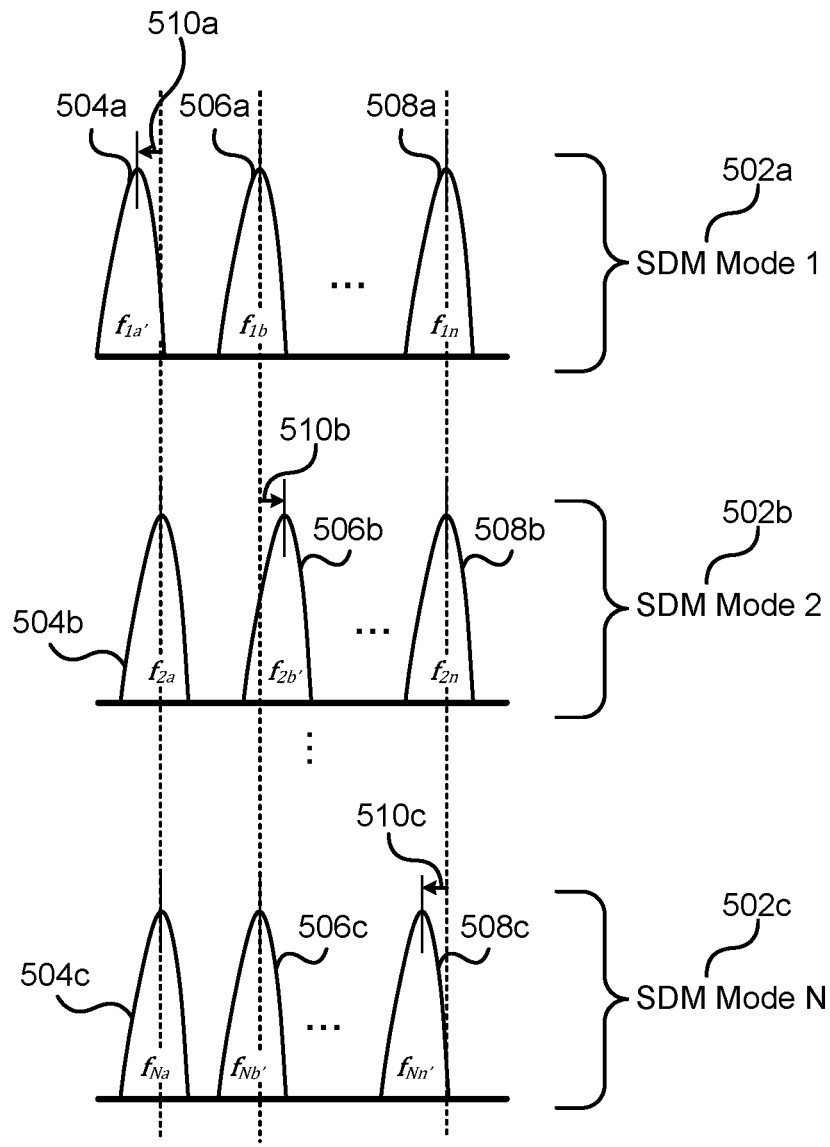
FIG. 5 depicts individual wavelength adjustment of WDM optical signals for SDM transmissions.

FIG. 5 depicts wavelength or optical frequency adjustment of WDM optical signals for SDM transmissions. The wavelength or frequency adjustment depicted in FIG. 5 is similar to the spectral adjustment of FIG. 6; however, instead of adjusting all wavelength channels of a WDM signal by an equal frequency shift, each individual wavelength channels of the WDM signal may be frequency shifted individually. Three WDM signals 502a, 502b, 502c multiplexed on different spatial modes of the SDM optical link are depicted in FIG. 5. In contrast to FIG. 4 in which the entire spectrum of frequencies of a WDM signal are shifted, one or more of the wavelength channels are shifted independent of other wavelength frequencies of the WDM signal. For example, WDM signal 502a comprises a number of wavelength channels 504a, 506a, 508a at respective frequencies and as depicted only the first wavelength channel 504a is shifted from a frequency of $f_{1a}$ to $f_{1a'}$, while the frequencies of other wavelength channels 506a, 508a remain at un-shifted frequencies of $f_{1b}$, and $f_{1n}$. Similarly, WDM signal 502b comprises a number of wavelength channels 504b, 506b, 508b at respective frequencies and as depicted only wavelength channel 506b is shifted from a frequency of $f_{1b}$ to $f_{2b'}$, while the frequencies of other wavelength channels 504b, 508b remain at un-shifted frequencies of $f_{2a}$, and $f_{2n}$. WDM signal 502c comprises a number of wavelength channels 504c, 506c, 508c at respective frequencies and as depicted only wavelength channel 508c is shifted from a frequency of $f_{Nn}$ to $f_{Nn'}$, while the frequencies of other wavelength channels 504c, 506c remain at un-shifted frequencies of $f_{Na}$, and $f_{Nb}$. As depicted, frequencies of individual wavelength channels of WDM signals may be independently shifted in order to reduce intermodal crosstalk. Although FIG. 5 depicts shifting only a single wavelength channel within a WDM signal, it is possible for more than one wavelength channel to be shifted, either by the same frequency shift amount or different frequency shift amounts. Further, although, FIG. 5 depicts shifting at least one wavelength channel of each WDM signals, it is possible for one or more of the WDM signals to have no wavelength channels that have been shifted. The frequency shifting of individual wavelength channels may also be combined with other adjustments to transmission characteristics including for example the spectral adjustment described above with regard to FIG. 4. Adjustments to other transmission characteristics may also be applied that may reduce crosstalk between the spatially multiplexed WDM signals. The frequency adjustment adjustment described above may transform in-band crosstalk into out-of band crosstalk.

Figure 6:
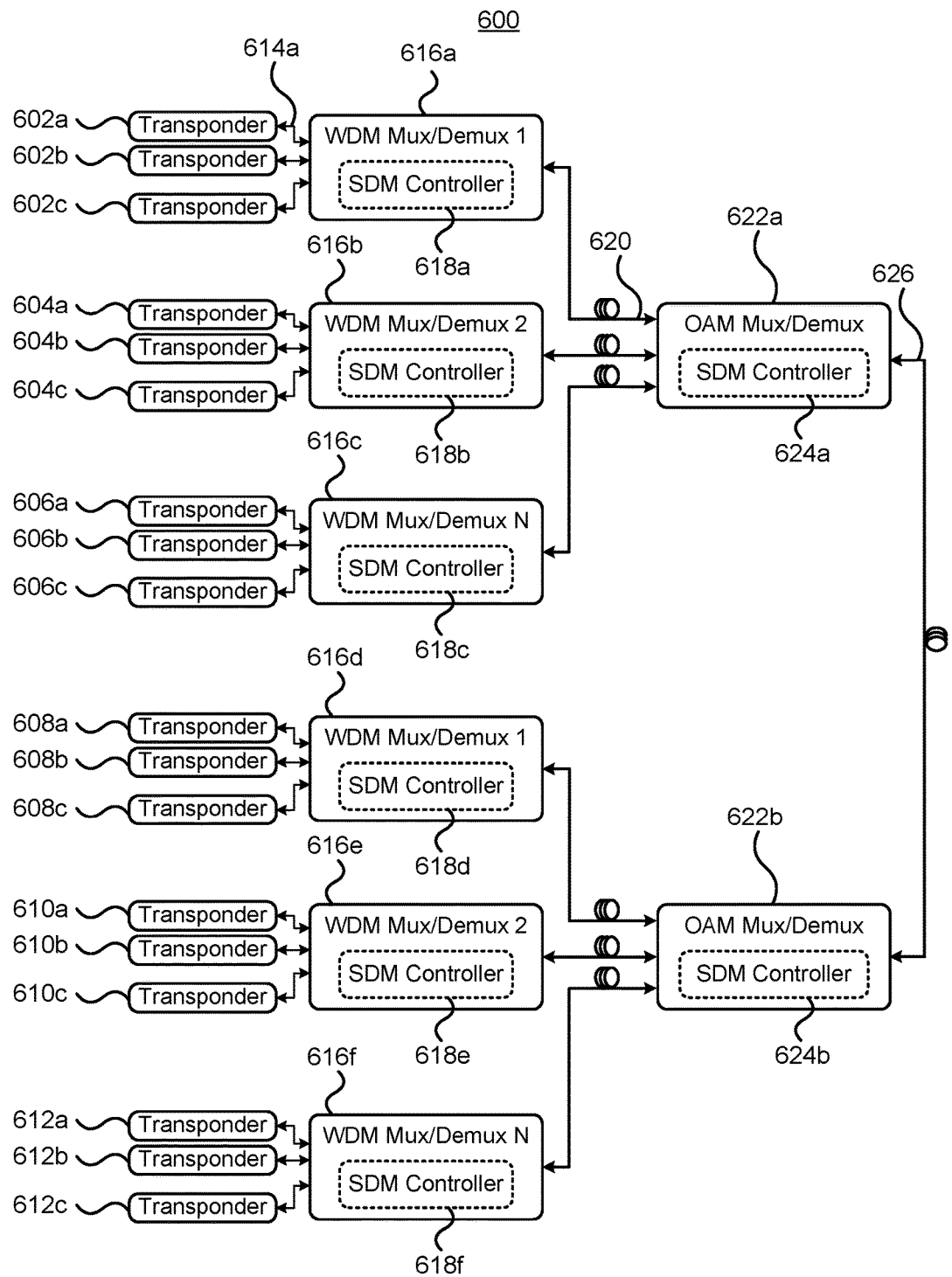
FIG. 6 is a schematic of an WDM/SDM optical network.

FIG. 6 is a schematic of an WDM/SDM optical network. The WDM/SDM optical network 600 comprises a single SDM optical link. The SDM optical link is depicted as an orbital angular momentum (OAM) optical link. It will be appreciated that larger optical networks are possible that may include multiple SDM optical links. The WDM/SDM optical network 600 provides bi-directional communication between different end-points provided by a plurality of optical transponders 602a-602c, 604a-604c, 606a-606c, 608a-608c, 610a-610c, 612a-612c. Each of the optical transponders 602a-602c, 604a-604c, 606a-606c, 608a-608c, 610a-610c, 612a-612c can transmit and receive optical signals. Various techniques may be used for transmitting the optical signals as well as receiving the optical signals. The transponders 602a-602c, 604a-604c, 606a-606c, 608a-608c, 610a-610c, 612a-612c may be tunable in order to allow adjustment of frequencies transmitted and/or received by the transponders. Although depicted as a combined transponder, it is possible to provide separate transmitters and responders or receivers. The individual transponders may be coupled to respective WDM multiplexers/demultiplexers by a plurality of optical waveguides, optical cables, or optical links to provide the bi-directional communication. Similarly, the WDM multiplexers/demultiplexers 616a-616f may be coupled to the OAM multiplexers/demultiplexers 622a, 622b by a plurality of different optical waveguides, optical cables, or optical links to provide bi-directional communication. The OAM multiplexers/demultiplexers 622a, 622b may be connected to each other by one or more SDM optical links. A single SDM optical link may carry optical signals in only one direction in which case multiple SDM optical links are required to provide bi-directional communication. Alternatively a single SDM optical link may carry optical signals in both directions using different SDM spatial modes. For example, a subset of the SDM spatial modes may be used for providing communication in one direction, and a second subset of the SDM spatial modes providing communication in the other direction.

The optical signals output from the transponders 602a-602c, 604a-604c, 606a-606c, 608a-608c, 610a-610c, 612a-612c are multiplexed together onto different wavelength channels. Similarly, the transponders may receive optical signals that were demultiplexed from a WDM signal. The optical signals provided from and to the transponders are depicted by the bi-directional arrow, one of which is labeled as 614a. FIG. 6 depicts a plurality of WDM multiplexers/demultiplexers 616a-616f that multiplex the individual optical signals from the transponders into WDM optical signals, one of which is labeled as arrow 620. The WDM multiplexers/demultiplexers 616a-616f also demultiplexes received WDM signals and provides the demultiplexed optical signals to respective transponders. A plurality of WDM optical signals are provided to SDM multiplexers/demultiplexers. The SDM multiplexers/demultiplexers are depicted as OAM multiplexers/demultiplexers 622a, 622b. The OAM multiplexers/demultiplexers 622a, 622b multiplex the plurality of WDM optical signals onto respective OAM spatial modes of the OAM optical link. Similarly, the OAM multiplexers/demultiplexers 622a, 622b demultiplex the individual WDM optical signals that have been multiplexed onto the individual OAM spatial modes of the OAM optical link 626.

The WDM optical signals multiplexed onto the different OAM spatial modes may suffer from intermodal crosstalk. The intermodal crosstalk may be reduced by measuring one or more performance metrics that can provide an indication of the crosstalk and then adjusting a transmission characteristic of one or more of the transmitted signals. The measurement and adjustment may be provided by SDM controller functionality 618a-618f, 624a-624b which is depicted as being distributed across the various components of the WDM/SDM optical network 600. It is noted that the SDM controller functionality may be incorporated into the transponders; however it has been omitted from FIG. 6 for simplicity of the drawing. The SDM controller functionality 618a-618f, 624a-624b may include functionality for measuring one or more performance metrics indicative of intermodal crosstalk between WDM optical signals that have been multiplexed onto different OAM spatial modes, determining possible adjustments to reduce the intermodal crosstalk and adjusting one or more transmission characteristics, including for example frequencies of one or more wavelength channels. Adjusting one or more transmission characteristics may also require adjusting one or more characteristics for proper reception of the adjusted optical signal. As an example, if the frequency that a particular wavelength channel is transmitted over is adjusted, one or more optical components of the network may also need to be adjusted to ensure the signal is properly received. For example, if the optical network includes tunable optical filters, they may need to be adjusted to ensure the frequency shifted wavelength channel is transmitted correctly. Similarly, the receiver or responder of the transponders may need to be adjusted to receive the signal of the frequency shifted wavelength channel.

Figure 7A:
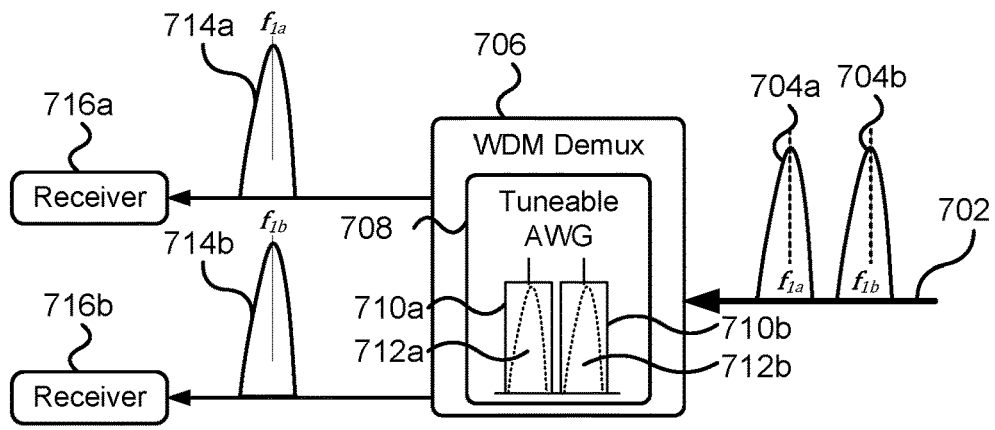
FIGS. 7A-7C depict WDM demultiplexer tuning in an SDM system incorporating crosstalk-based transmission adjustment.
Figure 7B:
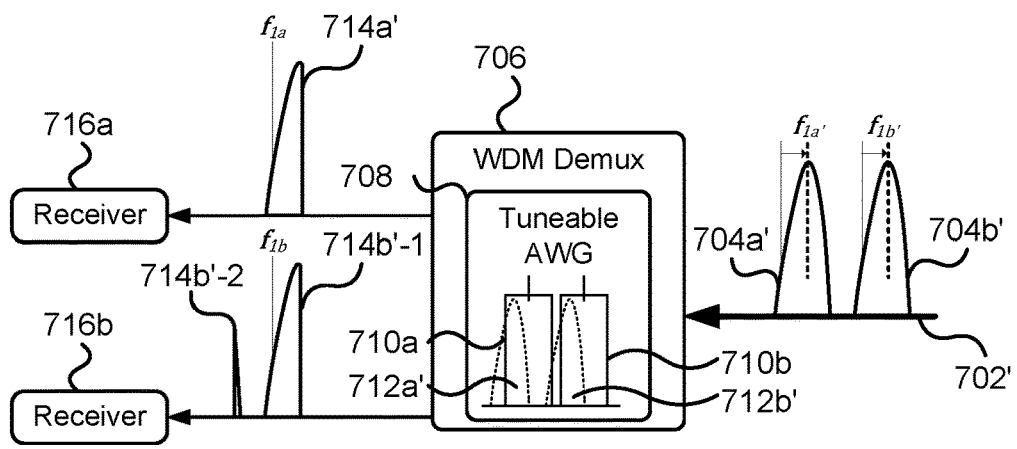
Figure 7C:
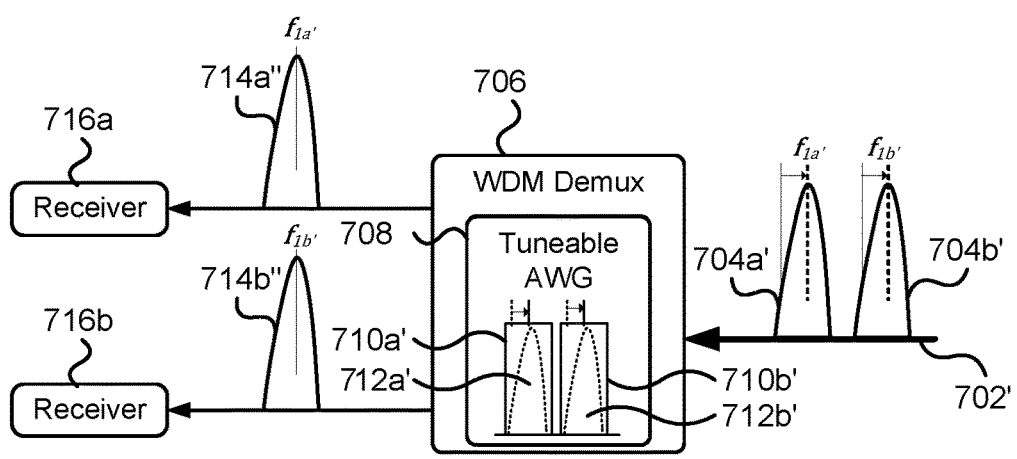

FIGS. 7A-7C depict WDM demultiplexer tuning in an SDM system incorporating crosstalk-based transmission adjustment. FIG. 7A depicts reception of wavelength channels that have not been frequency shifted. FIG. 7B depicts reception of wavelength channels that have been frequency shifted by a WDM demultiplexer that has not been tuned to the frequency shift. FIG. 7C depicts reception of wavelength channels that have been frequency shifted by a WDM demultiplexer that has been tuned to the frequency shift. The WDM signals depicted in FIGS. 7A-7C may be WDM optical signals that have been demultiplexed from spatial modes of an SDM optical link. As depicted in FIG. 7A a WDM optical signal 702 comprises a plurality of wavelength channels 704a, 704b at respective frequencies of $f_{1a}$, $f_{1b}$. The WDM optical signal 702 is received at a WDM demultiplexer 706 that receives the WDM optical signal 702 and demultiplexes and outputs the individual optical signals 714a, 714b to respective receivers 716a, 716b. The WDM demultiplexer is depicted as being provided by a tunable array waveguide grating (AWG) 708. The AWG 708 can demultiplex signals at different frequency ranges, depicted as rectangles 710a, 710b. As depicted in FIG. 7A, the frequency ranges of the tunable AWG 708 match the frequencies of the wavelength channels of the WDM signal, which are depicted schematically by dashed lines 712a, 712b. As depicted in FIG. 7A, the frequency ranges 710a, 710b of the tunable AWG 708 are aligned with the frequencies of the wavelength channels 712a, 712b, and as such the individual output signals 714a, 714b substantially correspond to the multiplexed signals of the wavelength channels 704a, 704b.

In contrast to FIG. 7A, FIG. 7B depicts demultiplexing a WDM signal with a demultiplexer that is not tuned to the frequencies of the wavelength channels. As depicted, a WDM optical signal 702' comprises a plurality of wavelength channels 704a', 704b' that have been frequency shifted to new frequencies $f_{1a'}$, $f_{1b'}$. The frequency shift may be a result of, for example, spectral or frequency tuning, or adjustments to other transmission characteristics of the optical signals of the WDM signal. The WDM signal 702' is received at the WDM demultiplexer 706. The tunable AWG 708 is tuned as described above to separate signals at un-shifted frequency ranges centered about $f_{1a}$, $f_{1b}$ depicted by rectangles 710a, 710b. However, as depicted, the frequency ranges of the tunable AWG 708 are not matched to the frequency shifted wavelength channels depicted by dashed lines 712a', 712b'. The optical signal 714a' output by the demultiplexer is a partially cropped signal of the signal of the first wavelength channel 704a'. Similarly, the optical signal separated by the AWG at the frequency range centered about $f_{1b}$ comprises a cropped portion 714b'-1 corresponding to a cropped portion of the first wavelength channel 704a' and a cropped portion 714b'-2 corresponding to a cropped portion of the second wavelength channel 704b'. Accordingly, the optical signals 714a', 714b'-1 and 714b'-2 output by the demultiplexer and supplied to the receivers 716a, 716b do not correspond to the transmitted wavelength channel signals 704a', 704b' and the data may not be properly received, resulting in possible performance degradation.

FIG. 7C depicts the demultiplexing of the frequency shifted WDM signal 702' described above with reference to FIG. 7B by a properly tuned WDM demultiplexer 706. As depicted, the frequency ranges, depicted by rectangles 710a', 710b' of the tunable AWG 708 are shifted to match the frequency shifted wavelength channels depicted by dashed lines 712a', 712b'. With the tunable AWG 708 adjusted according to the frequency shift applied to the wavelength channels, the WDM multiplexer outputs to, optical receivers 716a, 716b, the optical signals 714a'', 714b'', which may be at the shifted frequencies of $f_{1a'}$, $f_{1b'}$. As depicted, the optical signals 714a'', 714b'' output using the properly tuned AWG 708 substantially correspond to the signals of the wavelength channels. The SDM control described above may adjust the transmission characteristics in coordination with adjusting the appropriate receiver characteristics, as well as any characteristics of intervening optical components, in order to make the transmission adjustments transparent for the data carried on the WDM channels.

FIGS. 7A-7C depict tuning an AWG of a demultiplexer in accordance with adjustments made to the transmission characteristics of the optical signals. The tunable AWG described above is only one example of possible adjustments of optical components that may be necessary in order to properly receive the optical signals that have been adjusted in order to reduce the intermodal crosstalk between multiplexed spatial modes. Other architectures for the transmission and reception of WDM optical signals may include colorless, directionless architectures (CD) or colorless, contensionless, directionless (CDC) architectures. The architecture of the optical network, including the transponder and the WDM multiplexer/demultiplexer technology used, may dictate the types of tuning required. For example, a coherent receiver may be used that can be tuned to receive only a particular wavelength channel with the frequency range of the received channel being adjustable. Further, coherent receivers may be capable of automatically tracking small frequency shifts in optical signals. Other characteristics may need to be adjusted in order to properly receive optical signals that have been adjusted to reduce intermodal crosstalk. For example, if a coding scheme of the transmitted data is adjusted, a decoder may need to be adjusted in order to use the appropriate decoding scheme.

Figure 8:
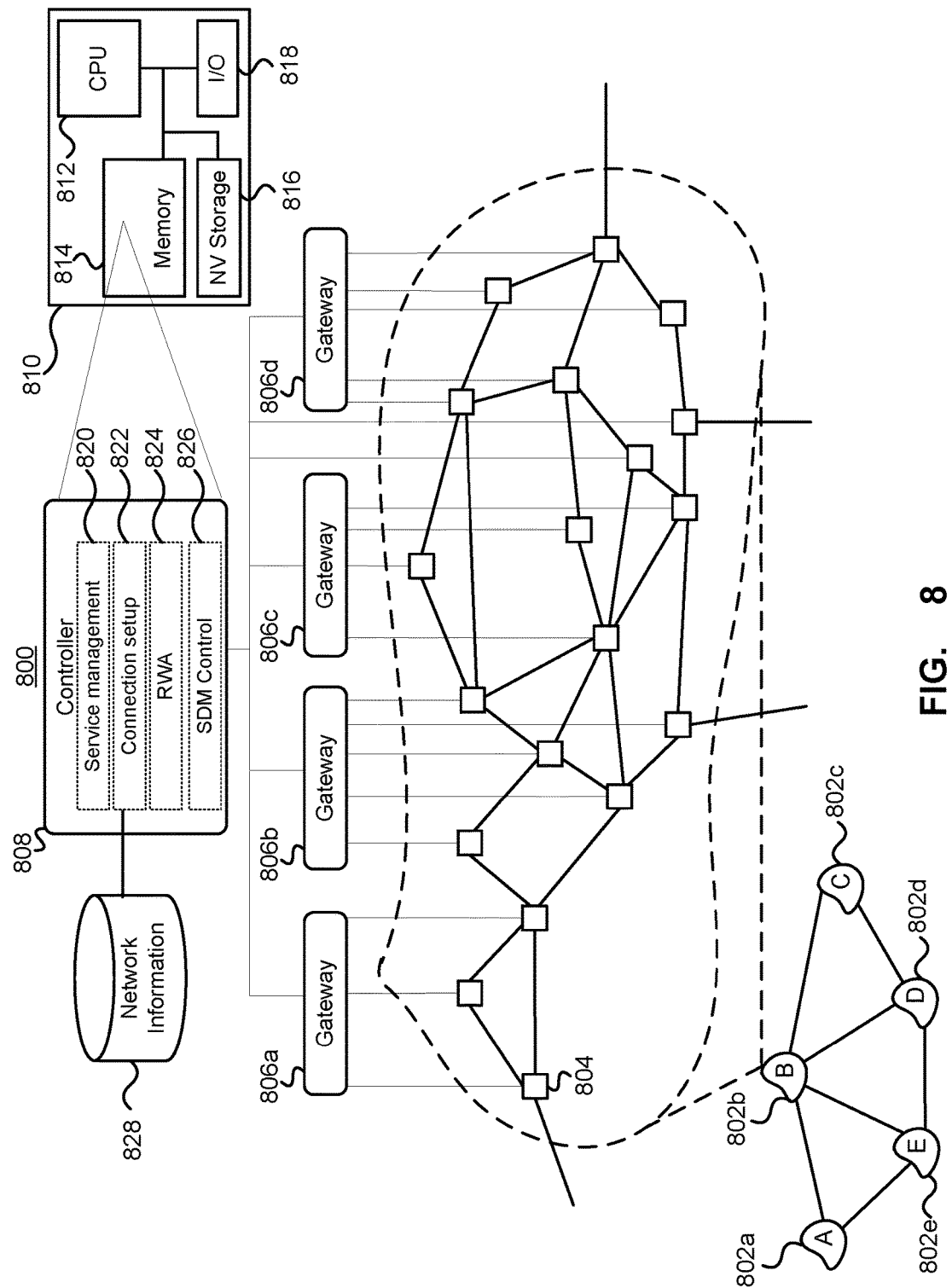
FIG. 8 depicts a software defined networking (SDN) optical network incorporating crosstalk-based transmission adjustment of SDM optical signals.

FIG. 8 depicts a schematic of an optical network and control system. The optical network and control system 800 may provide a software defined networking (SDN) optical network incorporating crosstalk-based transmission adjustment of SDM optical signals. The optical network and control system 800 comprises an optical network and a controller 808 for configuring components of the optical network. The optical network may comprise a number of interconnected optical networks 802a, 802b, 802c, 802d, 802e (referred to as optical networks 802). The group of optical networks 802 may provide a multi-domain network with each of the individual optical networks 802 providing a separate domain. Each of the optical networks 802 may comprise a number of interconnected optical components, depicted as individual squares 804. The interconnected optical components 804 may include for example network access nodes, or optical switches. The optical switches may provide utilizing reconfigurable add-drop multiplexer ROADM based architectures that are connected to other access nodes or switches via fiber optic cables or links. A network segment may correspond to a piece of the network between two connected access nodes. One or more of the optical networks 802 may include one or more optical links comprising an SDM optical link that multiplexes a plurality of optical signals onto different spatial modes of the SDM optical link.

A data plane may be established between the optical components 804 to carry the network traffic. Additionally, a control plane can also established within the optical network to provide a communication network between the network access nodes 804 and the controller 808. The control plane may be established over the data plane, for example using a time slot, or particular wavelength, of the data plane to transmit the control plane, or through a packet based network used to interconnect control and management of nodes 804. The control plane may connect one or more of the access nodes 804 directly to the controller 808, or through one or more gateways 806a, 806b, 806c, 806d. The control plane allows the controller 808 to request, or otherwise receive, control information, such as performance related information including measured performance metrics, usage information, etc., from the network access nodes 804, and to send configuration commands, including for example commands for adjusting one or more transmission characteristics and corresponding reception characteristics, to the network access nodes 804 or other components of the optical network. The parameters monitored by nodes may be accessed in various ways, including, for example by periodically pulling or requesting the parameters from the nodes, pulling or requesting the parameters on demand when they are required, periodically pushing the parameters from the node for storage and subsequent access from the storage location, or pushing the parameters from the node for storage and subsequent access when the parameter changes.

The controller 808 may be provided by a server 810 comprising a processor 812 for executing instructions stored in memory 814. In addition to the memory 814, the server 810 may also include non-volatile storage 816 for long term storage of instructions and data. The server 810 may also include one or more input/output (I/O) components 818 for connecting the server to one or more other components. Although depicted as a single server 810, the functionality provided by the controller 808 may be distributed over a plurality of devices. Further multiple controllers may be provided by one or more servers.

The controller 808 may provide various functionality for configuring and controlling the optical network. For example, the controller 808 may provide service management functionality 820, connection setup functionality 822 as well as route and wavelength assignment (RWA) functionality 824. The controller 808 may include SDM control functionality 826 that can monitor performance metrics of an SDM optical link and adjust transmission characteristics of one or more optical signals carried over the SDM optical link in order to reduce intermodal crosstalk. The SDM control functionality 826 may periodically request and receive the monitored performance metrics from the access nodes 804, either directly or through one or more gateways 806. The received metrics may be stored for example in a network information database 828. Additionally or alternatively, the SDM control functionality 826 may request and receive the monitored metrics from the access nodes 804 when the metrics are required, for example when determining possible adjustments to make to reduce intermodal crosstalk. Further still, the access nodes 804 may periodically push measured metrics to the SDM control functionality 826 or may push parameters to the SDM control functionality 826 when the parameters change, or change by at least a threshold amount. The SDM control functionality 826 may utilize the monitored metrics in order to adjust the SDM multiplexed signals to reduce crosstalk as described above.

Figure 9:
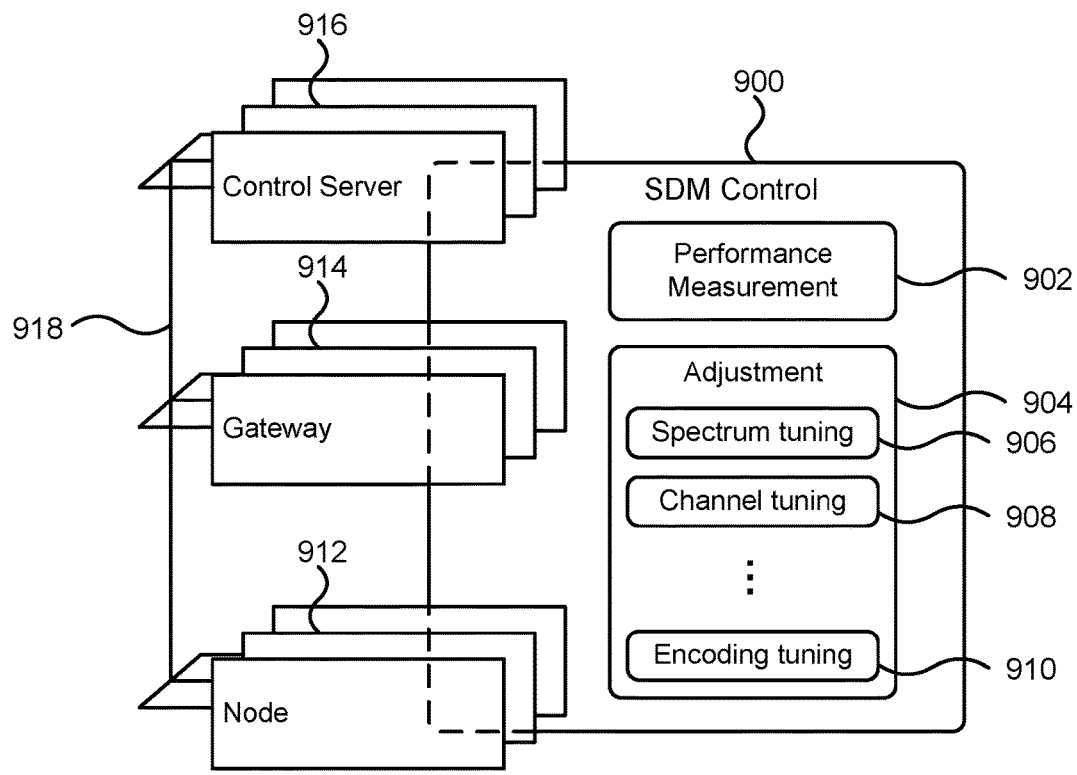
FIG. 9 depicts a distributed SDM controller.

FIG. 9 is a schematic representation of a distributed SDM controller. As described above with reference to FIG. 8, the optical network and controller may be provided by a plurality of different components, including a plurality of interconnected nodes 804 or switches, one or more gateway nodes 806 that may be in communication with a plurality of the nodes 804 and one or more controllers that control the overall operation of the optical network. As depicted in FIG. 9, the controller functionality and in particular the SDM control functionality described above, as well as that described below, may be distributed among the different hardware components. The SDM control functionality 900 may be implemented across different components of the optical network. As depicted, portions of the SDM control functionality 900 may be distributed among network nodes 912, gateways 914 and control servers 916. As depicted the various components are communicatively coupled together by a control plane 918. The nodes 912, gateways 914 and control servers 916 can each implement different portions of the SDM control functionality 900. As will be appreciated, the particular portions of the SDM control functionality that is implemented in a particular component may vary.

The SDM control functionality 900 that is distributed amongst numerous components may include performance metric measurement functionality 902 for measuring performance metrics of SDM multiplexed signals. The performance metrics measured by the performance metric measurement functionality 902 may be used by adjustment functionality 904 in order to adjust one or more transmission characteristics of the SDM multiplexed signals in order to reduce the crosstalk between the optical signals multiplexed onto the different spatial modes. The adjustment functionality 904 may use various adjustment approaches in order to reduce the crosstalk. For example, the adjustment functionality 904 may apply spectrum tuning 906 that shifts the entire spectrum of an optical signal up or down and channel tuning 908 that shifts the frequency of one or more wavelength channels of a WDM optical signal up or down. Other techniques may be applied by the adjustment functionality 904 including for example, encoding tuning that adjusts an encoding technique used for one or more of the signals. The various tuning adjustments made to transmission characteristics may require corresponding adjustments to be made at one or components of the optical network in order to provide proper reception of the adjusted optical signal.

The present disclosure provided, for the purposes of explanation, numerous specific embodiments, implementations, examples and details in order to provide a thorough understanding of the invention. It is apparent, however, that the embodiments may be practiced without all of the specific details or with an equivalent arrangement. In other instances, some well-known structures and devices are shown in block diagram form, or omitted, in order to avoid unnecessarily obscuring the embodiments of the invention. The description should in no way be limited to the illustrative implementations, drawings, and techniques illustrated, including the exemplary designs and implementations illustrated and described herein, but may be modified within the scope of the appended claims along with their full scope of equivalents.

While several embodiments have been provided in the present disclosure, it should be understood that the disclosed systems and components might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

What is claimed is:

1. A method for use in a spatial division multiplexed (SDM) optical network transmitting a plurality of optical signals over an optical link, wherein each one of the plurality of optical signals is transmitted in a respective one of a plurality of spatial modes of the optical link, the method comprising:
  monitoring a transmission performance metric of the optical link, the transmission performance metric indicative of crosstalk between two of the plurality of optical signals transmitted in different ones of the plurality of spatial modes;
  adjusting a transmission characteristic comprising a spectral profile of one of the two optical signals to reduce the crosstalk indicated by the monitored transmission performance metric; and
  adjusting at least one intervening optical component of the SDM network in coordination with the adjusted transmission characteristic;
  whereby the one of the two optical signals is properly received in accordance with a reduction in the crosstalk.

2. The method of claim 1, wherein each one of the two optical signals comprises a wavelength division multiplexed (WDM) optical signal having a plurality of optical channels having different optical channel frequencies.

3. The method of claim 2, wherein adjusting the transmission characteristic of the one of the two optical signals comprises shifting an optical channel frequency of an optical channel of the plurality of optical channels of a corresponding WDM optical signal by a frequency shift.

4. The method of claim 3, wherein adjusting the transmission characteristic of the one of the two optical signals comprises shifting each optical channel frequency of the plurality of optical channels of the corresponding WDM optical signal by the frequency shift.

5. The method of claim 3, wherein shifting the optical channel frequency results in shifting of at least a portion of in-band optical channel crosstalk between the two WDM optical signals to out-of-band optical channel crosstalk.

6. The method of claim 3, wherein the individual optical channels of the WDM optical signal are received at a receiver capable of tracking the adjusted transmission characteristic of the one of the two optical signals.

7. The method of claim 3, wherein an indication of the frequency shift is provided to receivers of the individual optical channels of the corresponding WDM optical signal.

8. The method of claim 1, further comprising:
  adjusting a transmission characteristic of the other one of the two optical signals.

9. The method of claim 1, wherein adjusting the transmission characteristic further comprises adjusting at least one of:
  a data rate of the one of the two optical signals;
  a modulation scheme of the one of the two optical signals;
  a forward-error-correction (FEC) coding used by the one of the two optical signals;
  a modulation depth of the one of the two optical signals;
  a constellation map of the one of the two optical signals;
  a power level of at the of the two optical signals;
  a spectrum shape of at the of the two optical signals;
  a frequency spectral utilization of the one of the two optical signals; and
  a coding efficiency of the one of the two optical signals.

10. The method of claim 1, wherein the transmission performance metric comprises at least one of:
  a Q-factor of at least one of the two optical signals;
  a Q-factor of an optical supervisory channel (OSC) signal;
  a bit-error-rate of at least one of the two optical signals;
  a bit-error-rate of the OSC signal;
  a signal-to noise ratio of at least one of the two optical signals; and
  a signal-to noise ratio of the OSC signal.

11. The method of claim 1, wherein the optical link is provided by one of:
  a multi-mode fiber;
  a few-mode fiber;
  a multi-core fiber;
  a hybrid multi-core multi-mode fiber;
  a ring core fiber;
  a hollow-core fiber;
  an orbital angular momentum (OAM) fiber; and
  a free-space optical link.

12. A controller in a spatial division multiplexed (SDM) optical network transmitting a plurality of optical signals over an optical link, wherein each one of the plurality of optical signals is transmitted in a respective one of a plurality of spatial modes of the optical link, the controller comprising:
  at least one processing unit for executing instructions; and
  at least one memory unit for storing instructions, which when executed by the at least one processing unit configure the controller to:
    monitor a transmission performance metric of the optical link, the transmission performance metric indicative of crosstalk between two of the plurality of optical signals transmitted in different ones of the plurality of spatial modes;
    adjust a transmission characteristic comprising a spectral profile of one of the two optical signals to reduce the crosstalk indicated by the monitored transmission performance metric; and
    adjust at least one intervening optical component of the SDM network in coordination with the adjusted transmission characteristic;
    whereby the one of the two optical signals is properly received in accordance with a reduction in the crosstalk.

13. The controller of claim 12, wherein the controller is provided by:
  a centralized controller;
  a distributed controller; or
  a hybrid centralized-distributed controller.

14. The controller of claim 12, wherein the SDM optical network is a software-defined network (SDN).

15. The controller of claim 12, wherein each one of the two optical signals comprises a wavelength division multiplexed (WDM) optical signal having a plurality of optical channels having different optical channel frequencies.

16. The controller of claim 15, wherein adjusting the transmission characteristic of the one of the two optical signals comprises shifting an optical channel frequency of an optical channel of the plurality of optical channels of a corresponding WDM optical signal by a frequency shift.

17. The controller of claim 16, wherein adjusting the transmission characteristic of the one of the two optical signals comprises shifting each optical channel frequency of the plurality of optical channels of the corresponding WDM optical signal by the frequency shift.

18. The controller of claim 15, wherein shifting the optical channel frequency results in shifting of at least a portion of in-band optical channel crosstalk between the two WDM optical signals to out-of-band optical channel crosstalk.

19. The controller of claim 15, wherein the individual optical channels of the WDM optical signal are received at a receiver capable of tracking the adjusted transmission characteristic of the one of the two optical signals.

20. The controller of claim 15, wherein an indication of the frequency shift is provided to receivers of the individual optical channels of the corresponding WDM optical signal.

21. The controller of claim 12, wherein the controller is further configured to:
adjust a transmission characteristic of the other one of the two optical signals.

22. The controller of claim 12, wherein adjusting at least one transmission characteristic further comprises adjusting at least one of:
a data rate of the one of the two optical signals;
a modulation scheme of the one of the two optical signals;
a forward-error-correction (FEC) coding used by the one of the two optical signals;
a modulation depth of the one of the two optical signals;
a constellation map of the one of the two optical signals;
a power level of at the of the two optical signals;
a spectrum shape of at the of the two optical signals;
a frequency spectral utilization of the one of the two optical signals; and
a coding efficiency of the one of the two optical signals.

23. The controller of claim 12, wherein the transmission performance metric comprises at least one of:
a Q-factor of at least one of the two optical signals;
a Q-factor of an optical supervisory channel (OSC) signal;
a bit-error-rate of at least one of the two optical signals;
a bit-error-rate of the OSC signal;
a signal-to noise ratio of at least one of the two optical signals; and
a signal-to noise ratio of the OSC signal.

24. The controller of claim 12, wherein the optical link is provided by one of:
a multi-mode fiber;
a few-mode fiber;
a multi-core fiber;
a hybrid multi-core multi-mode fiber;
a ring core fiber;
a hollow-core fiber;
an orbital angular momentum (OAM) fiber; and
a free-space optical link.

* * * * *